(12) United States Patent
Nishimura et al.

(10) Patent No.: US 11,093,791 B2
(45) Date of Patent: Aug. 17, 2021

(54) INFORMATION PROCESSING APPARATUS

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 16/193,700

(22) Filed: Nov. 16, 2018

(65) Prior Publication Data
US 2019/0156147 A1    May 23, 2019

(30) Foreign Application Priority Data

Nov. 20, 2017  (JP) .............................. JP2017-223085

(51) Int. Cl.
*G06K 9/62* (2006.01)
*H04N 5/77* (2006.01)
*G06K 9/46* (2006.01)
*G06K 9/00* (2006.01)

(52) U.S. Cl.
CPC ....... *G06K 9/6215* (2013.01); *G06K 9/00791* (2013.01); *G06K 9/4647* (2013.01); *G06K 9/6212* (2013.01); *H04N 5/77* (2013.01)

(58) Field of Classification Search
CPC ............. G06K 9/6215; G06K 9/00791; G06K 9/4647; G06K 9/6212; H04N 5/77
See application file for complete search history.

(56) References Cited

U.S. PATENT DOCUMENTS

| 7,116,353 B2 * | 10/2006 | Hobson | G07F 19/20 |
| | | | 348/150 |
| 2012/0288145 A1 * | 11/2012 | Kido | G06K 9/00825 |
| | | | 382/103 |

FOREIGN PATENT DOCUMENTS

| JP | 2009-122997 A | | 6/2009 |
| JP | 2009122997 A | * | 6/2009 |
| JP | 2010177731 A | | 8/2010 |
| JP | 2011014988 A | | 1/2011 |
| JP | 2013042412 A | | 2/2013 |

* cited by examiner

*Primary Examiner* — Wednel Cadeau
(74) *Attorney, Agent, or Firm* — Hunton Andrews Kurth LLP

(57) ABSTRACT

An information processing apparatus includes an acquisition unit, a determination unit, and a storage unit. The acquisition unit is configured to acquire an image outside a vehicle captured by a camera installed in the vehicle. The determination unit is configured to determine whether or not a determination target image is similar to a reference image based on luminance values of the reference image and the determination target image. The reference image is selected from pieces of image acquired by the acquisition unit. The determination target image is captured after the reference image is acquired. The storage unit is configured to store the image acquired by the acquisition unit excluding the determination target image determined to be similar to the reference image by the determination unit.

6 Claims, 4 Drawing Sheets

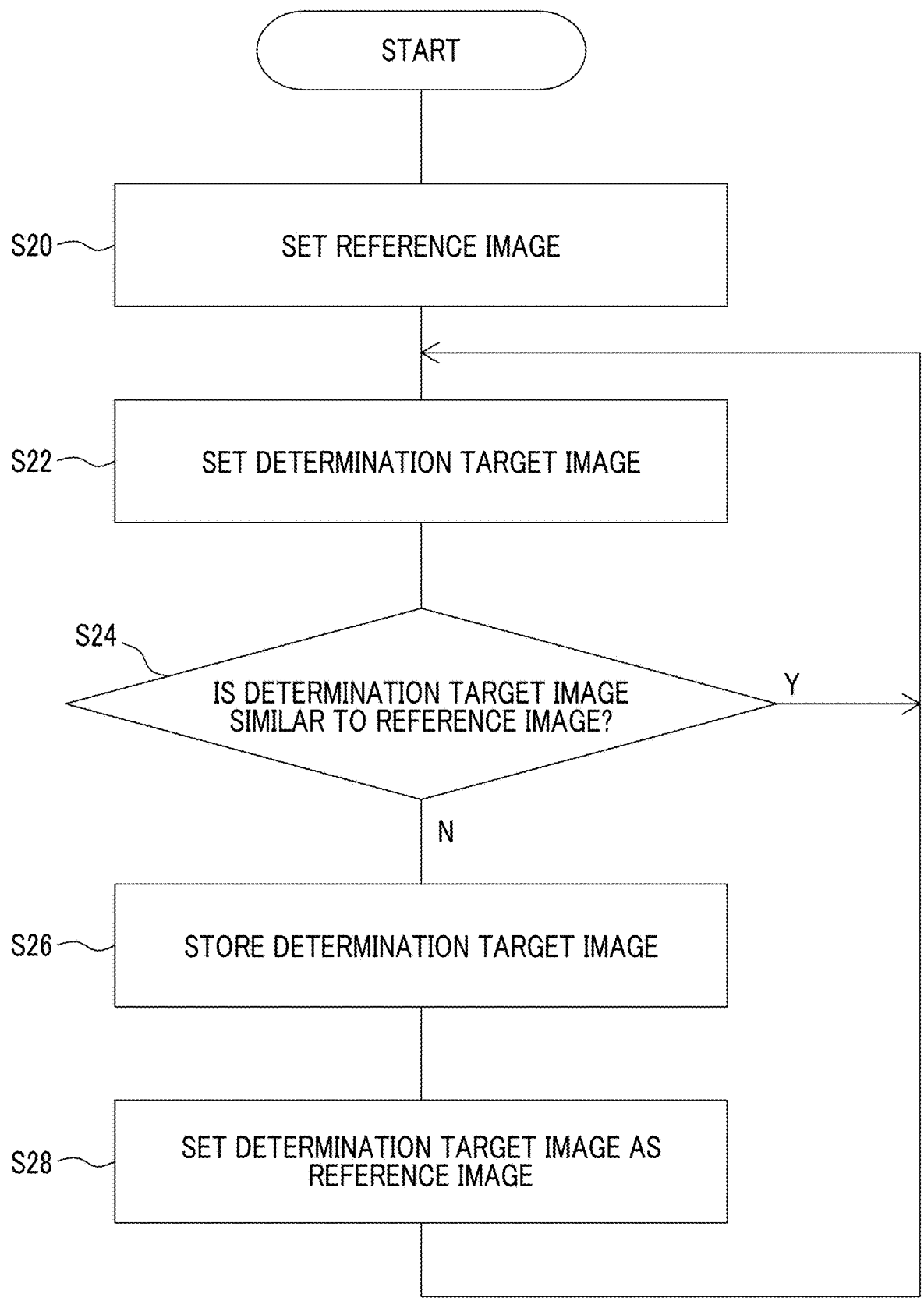

INFORMATION PROCESSING APPARATUS

INCORPORATION BY REFERENCE

The disclosure of Japanese Patent Application No. 2017-223085 filed on Nov. 20, 2017 including the specification, drawings and abstract is incorporated herein by reference in its entirety.

BACKGROUND

1. Technical Field

The present disclosure relates to an information processing apparatus that processes image information.

2. Description of Related Art

A technology to avoid storing of a large amount of data when a moving image in front of a vehicle recorded when the vehicle travels is stored in a database, is known (for example, refer to Japanese Unexamined Patent Application Publication No. 2009-122997 (JP 2009-122997 A)), and the technology avoids the storing of the large amount of data having less variation in travel route information by storing solely a moving image with attributes not stored in the database, that is, the moving image with attributes such as location, time, and weather for which recordings have not been made.

SUMMARY

In the technology, a moving image of a location or the like for which recording has not been made during travel is stored although the image is a moving image having less variation in travel route information. Therefore, there is a room for improvement in reducing the amount of data to be stored.

The present disclosure provides an information processing apparatus enabling further reduction in an amount of image data to be stored.

An aspect of the disclosure relates to an information processing apparatus. The information processing apparatus includes an acquisition unit, a determination unit, and a storage unit. The acquisition unit is configured to acquire an image outside a vehicle, the image being captured by a camera installed in the vehicle. The determination unit is configured to determine whether or not a determination target image is similar to a reference image based on luminance values of (i) the reference image and (ii) the determination target image. The reference image is selected from pieces of image acquired by the acquisition unit. The determination target image is captured after the reference image is acquired. The storage unit is configured to store the image acquired by the acquisition unit excluding the determination target image determined to be similar to the reference image by the determination unit.

According to the aspect of the disclosure, determination whether or not the determination target image is similar to the reference image is made based on the luminance value, the determination target image determined to be similar to the reference image is excluded, and the image is stored, and thus it is possible to further reduce the amount of data to be stored.

The information processing apparatus according to the aspect of the disclosure may further include a derivation unit. The derivation unit is configured to partition each of the reference image and the determination target image into a plurality of areas, to derive an average value of the luminance values in each area, and to derive an amount of variation in the average value of the luminance values of the determination target image with respect to the reference image on each of the plurality of areas. The determination unit may determine that the determination target image is similar to the reference image when the number of areas having an absolute value of the amount of variation less than a predetermined value is a predetermined number or more.

The information processing apparatus according to the aspect of the disclosure may further include a setting unit. The setting unit is configured to set a determination target image determined not to be similar to the reference image by the determination unit as a new reference image.

In the information processing apparatus according to the aspect of the disclosure, the setting unit may set all the images as the determination target images in image capturing order.

The information processing apparatus according to the aspect of the disclosure may further include a setting unit. The setting unit is configured to set an image captured subsequent to the determination target image determined to be similar to the reference image as a new determination target image without changing the reference image when the determination target image is determined to be similar to the reference image by the determination unit.

In the information processing apparatus according to the aspect of the disclosure, the determination unit may determine whether or not the determination target image is similar to the reference image while the image remains captured.

According to the aspect of the disclosure, it is possible to further reduce the amount of image data to be stored.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a flowchart showing processing in the information processing apparatus of FIG. 1.

DETAILED DESCRIPTION OF EMBODIMENTS

Figure 1:
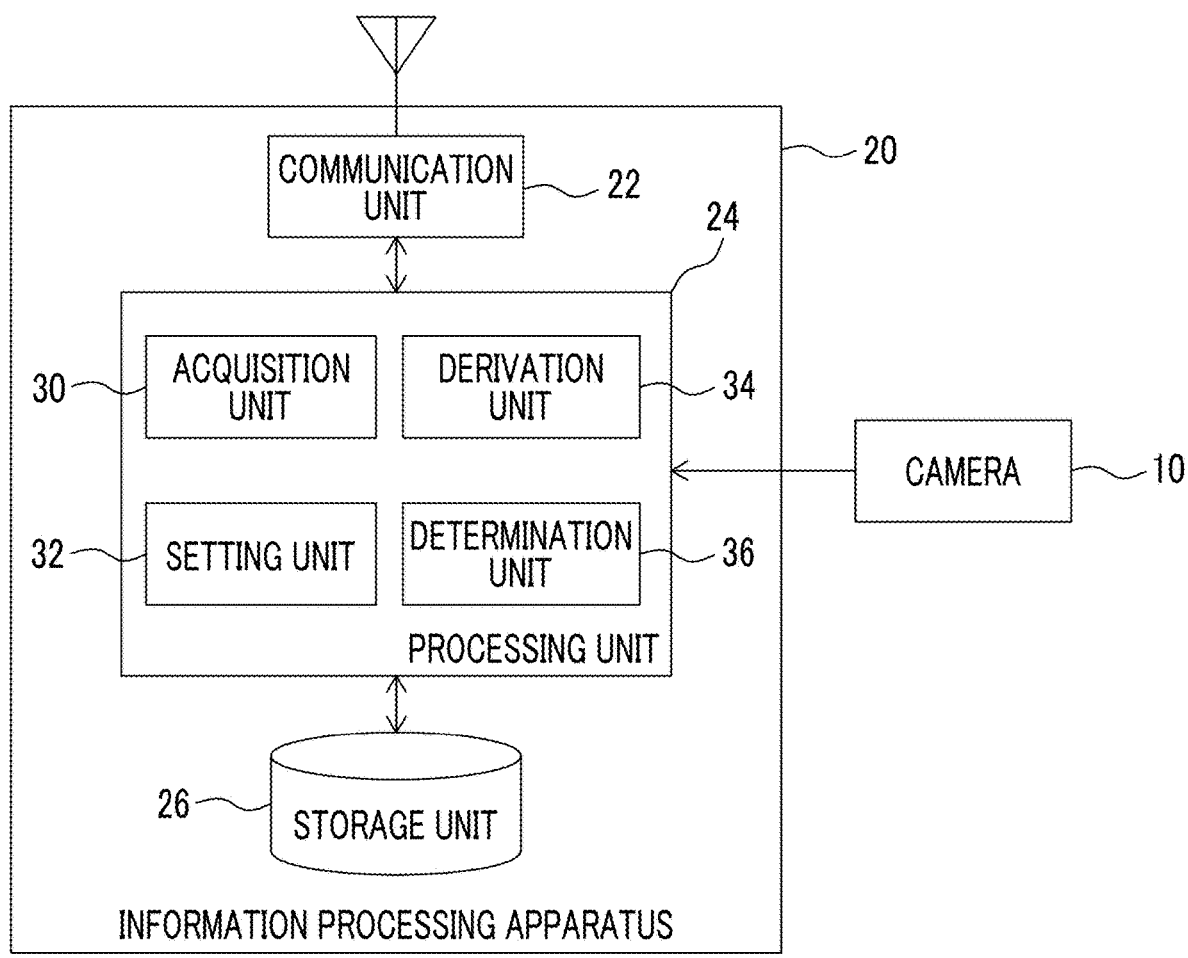
FIG. 1 is a block diagram showing a configuration of an on-vehicle system according to an embodiment.

FIG. 1 is a block diagram showing a configuration of an on-vehicle system 1 according to an embodiment. The on-vehicle system 1 is mounted on a vehicle which is an automobile. The on-vehicle system 1 includes a camera 10 and an information processing apparatus 20.

The camera 10 is installed in the vehicle and continuously captures capture images outside the vehicle. A plurality of the capture images constitutes a moving image. That is, the capture image is a still image and can also be called a frame. The capture image is, for example, an image in front of the vehicle. The camera 10 sequentially outputs the captured capture image to the information processing apparatus 20.

The information processing apparatus 20 processes the capture image output from the camera 10. The information processing apparatus 20 can also be called a drive recorder. The information processing apparatus 20 includes a communication unit 22, a processing unit 24, and a storage unit 26. The processing unit 24 includes an acquisition unit 30, a setting unit 32, a derivation unit 34, and a determination unit 36. In terms of hardware, the configuration of the processing unit 24 can be achieved by a central processing unit (CPU), a memory, and the other large-scale integrated circuit (LSI) of any computer. In terms of software, the configuration of the processing unit 24 is achieved by a program loaded in the memory, or the like. Here, functional blocks achieved by cooperation of hardware and software are described. Therefore, it is understood by those skilled in the art that the functional blocks can be achieved in various forms by hardware alone, software alone, or a combination of hardware and software.

The acquisition unit 30 sequentially acquires the images outside the vehicle captured by the camera 10. The setting unit 32 sets a reference image from pieces of the images acquired by the acquisition unit 30 (hereinafter referred to as "reference image") and a determination target image captured after the reference image is set(hereinafter referred to as "determination target image"). For example, a first reference image is an image captured first, and a first determination target image is an image captured second.

The derivation unit 34 partitions each of the reference image and the determination target image into a plurality of areas, derives an average value of luminance values in each area, and derives an amount of variation in the average value of the luminance values of the determination target image with respect to the reference image on each of the plurality of areas.

The determination unit 36 determines whether or not the determination target image is similar to the reference image based on the luminance values of the reference image and the determination target image. Specifically, the determination unit 36 determines that the determination target image is similar to the reference image in a case where the number of areas having an absolute value of the amount of variation derived by the derivation unit 34 less than a predetermined value is a predetermined number or more. On the other hand, the determination unit 36 determines that the determination target image is not similar to the reference image in a case where the number of areas having the absolute value of the amount of variation less than the predetermined value is less than the predetermined number. The predetermined value and the predetermined number can be appropriately determined by an experiment or the like. The determination unit 36 makes a determination while the capture image remains captured by the camera 10.

Figure 2A:
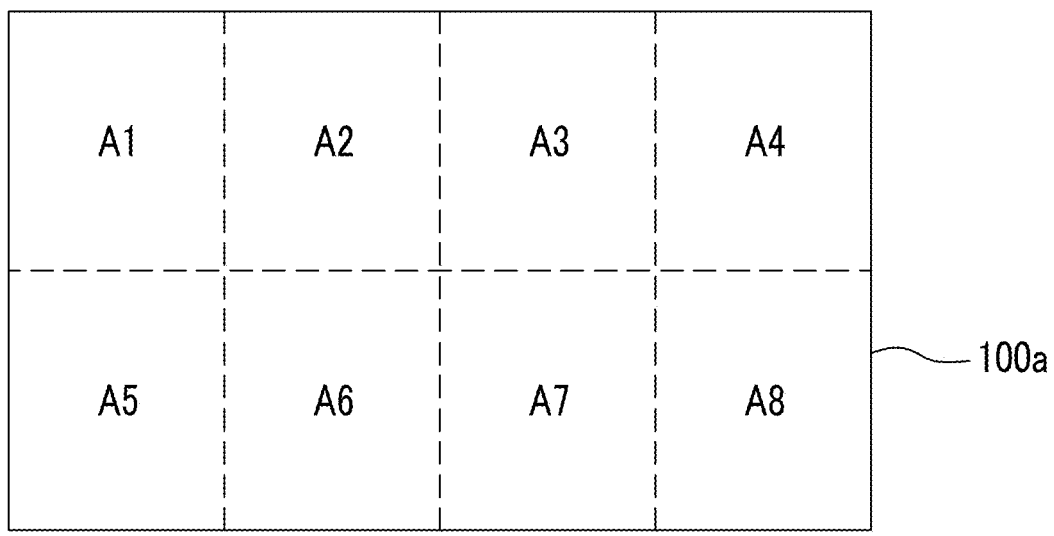
FIG. 2A is a diagram showing a plurality of areas of a reference image processed by an information processing apparatus of FIG. 1.
Figure 2B:
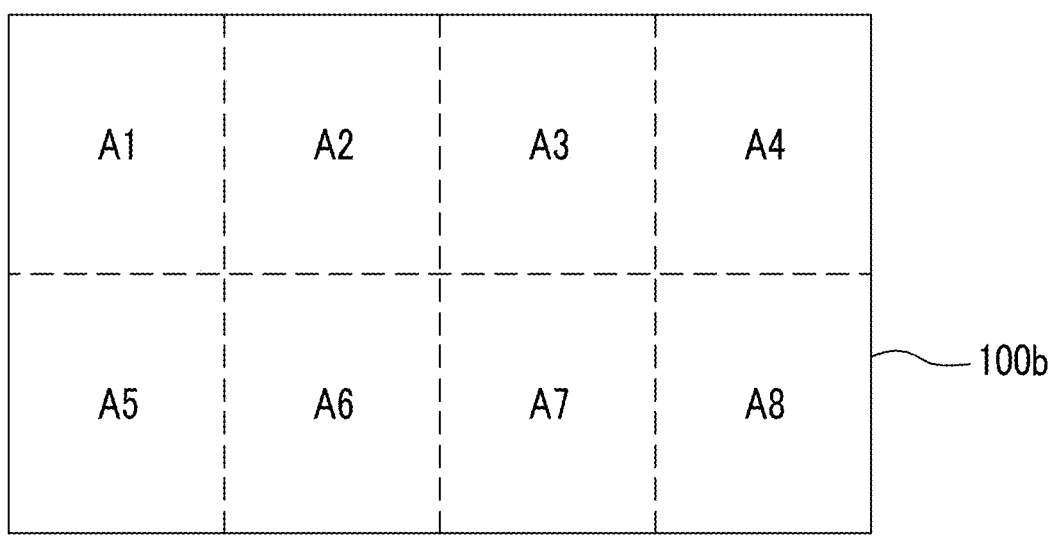
FIG. 2B is diagram showing a plurality of areas of a determination target image.

FIG. 2A is a diagram showing a plurality of areas A1 to A8 of a reference image 100*a* processed by the information processing apparatus 20 of FIG. 1, and FIG. 2B is a diagram showing a plurality of areas A1 to A8 of a determination target image 100*b*. As an example, the reference image 100*a* and the determination target image 100*b* each are partitioned into eight areas.

For example, assuming that the predetermined number is five, and in a case where the absolute value of the amount of variation in the average value of the luminance values of the determination target image 100*b* with respect to the reference image 100*a* in each of the six areas A1 to A6 is less than the predetermined value, the determination target image 100*b* is determined to be similar to the reference image 100*a*.

For example, in a case where the absolute value of the amount of variation in the average value of the luminance values of the determination target image 100*b* with respect to the reference image 100*a* in each of the six areas A1 to A6 is the predetermined value or more, the determination target image 100*b* is determined not to be similar to the reference image 100*a*.

The description refers back to FIG. 1. The storage unit 26 stores the capture image acquired by the acquisition unit 30 excluding the determination target image determined to be similar to the reference image by the determination unit 36. That is, the storage unit 26 stores the reference image, does not store the determination target image determined to be similar to the reference image, and stores the determination target image determined not to be similar to the reference image.

The setting unit 32 sets the determination target image determined not to be similar to the reference image by the determination unit 36 as a new reference image and sets a capture image captured subsequent to the new reference image as a new determination target image.

In a case where the determination unit 36 determines that the determination target image is similar to the reference image, the setting unit 32 sets a capture image captured subsequent to the determination target image determined to be similar to the reference image as a new determination target image without changing the reference image.

As described above, the setting unit 32 sets all the capture images as the determination target images in image capturing order. Then, the derivation unit 34, the determination unit 36, and the storage unit 26 repeat the above-described processing.

Figure 3:
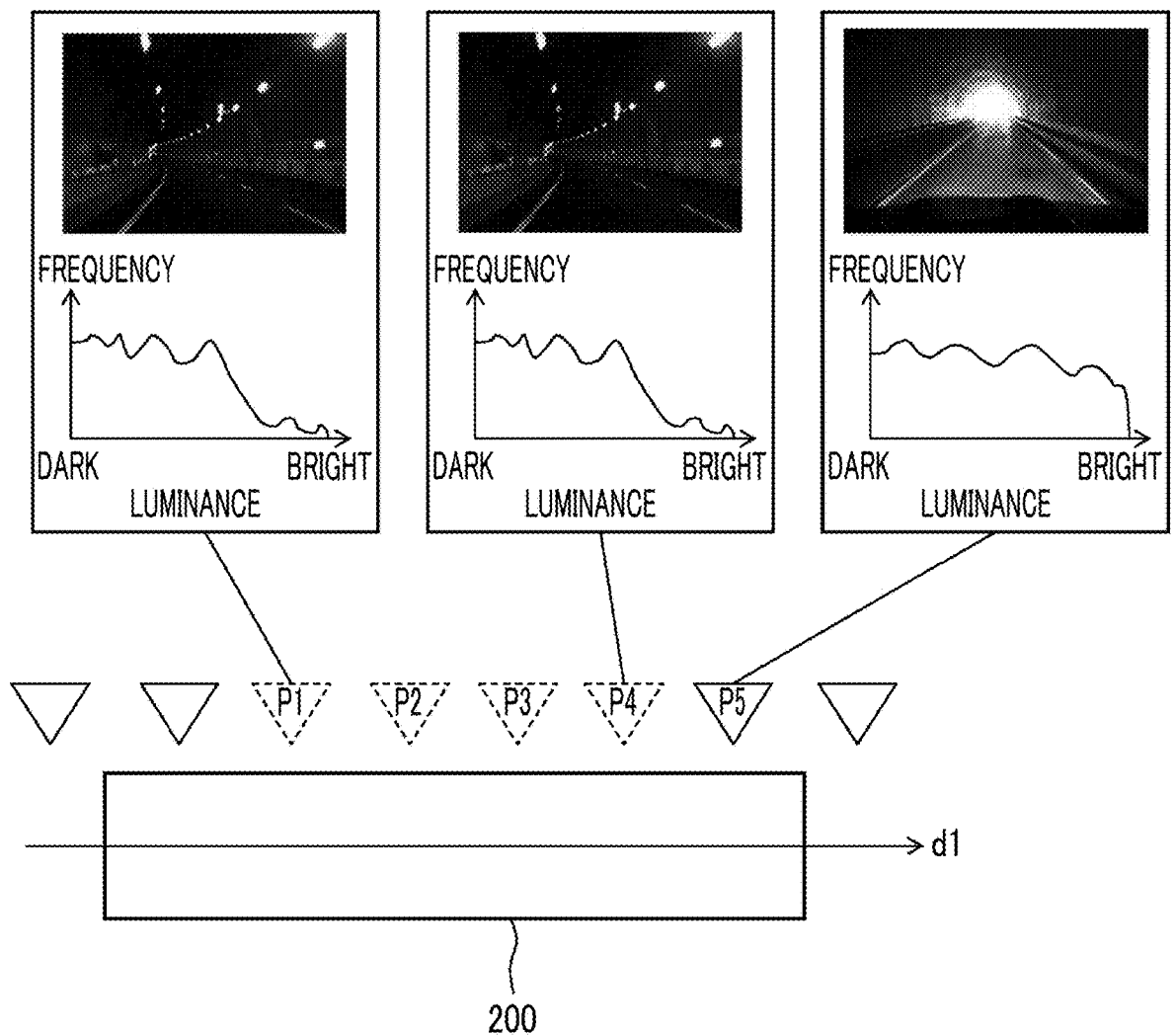
FIG. 3 is a view showing a capture image of when a vehicle on which the on-vehicle system of FIG. 1 is mounted is traveling in a tunnel.

FIG. 3 is a view showing a capture image of when the vehicle on which the on-vehicle system 1 of FIG. 1 is mounted is traveling in a tunnel 200. FIG. 3 shows the capture image at each of a position P1, a position P4, and a position P5 in the tunnel 200 when the vehicle travels in the tunnel 200 in a direction dl and a frequency distribution of the luminance of a plurality of pixels of the capture image. The capture image at the position P1 is the reference image. A capture image at a position P2, a position P3, or the like are not shown; however, the capture images at the position P2, the position P3, and the position P4 each have a relatively small amount of variation in the luminance value with respect to the capture image at the position P1 and are determined to be similar to the capture image at the position P1. As a result of the determination, the capture images from at the position P2 to the position P4 are not stored.

The capture image at the position P5 has a relatively large amount of variation in the luminance value with respect to the capture image at the position P1 and is determined not to be similar to the capture image at the position P1. Therefore, the capture image at the position P5 is stored and is set as a new reference image.

As described above, in a tunnel or the like, the capture image having a relatively small amount of variation in the luminance value may be captured.

The description refers back to FIG. 1. When an ignition switch (not shown) of the vehicle is turned off, the processing unit 24 reads out the capture image stored in the storage unit 26 and supplies the capture image to the communication unit 22. The communication unit 22 performs wireless communication with a server device (not shown) and transmits the capture image supplied from the processing unit 24 to the server device. The processing is performed until power supply to the information processing apparatus 20 is cut off. A wireless communication standard is not particularly limited, and includes, for example, third generation mobile communication systems (3G), fourth generation mobile communication systems (4G), or fifth generation mobile communication systems (5G).

The server device is installed in a data center, for example, and stores the capture images transmitted from the information processing apparatuses 20 of a plurality of vehicles on a per vehicle basis. The capture image stored in the server device is used for various purposes. For example, in response to a request from a user, the server device outputs the capture image captured in the vehicle specified by the user to a terminal device of the user. The user can check the capture image on the terminal device and check a traveling state of the vehicle.

Next, the overall operation of the information processing apparatus having the above configuration will be described. FIG. 4 is a flowchart showing processing in the information processing apparatus 20 of FIG. 1. The processing in FIG. 4 is started when the camera 10 starts capturing, and is finished when the camera 10 finishes the capturing.

The setting unit 32 sets the reference image in the capture image (S20) and sets the determination target image in the capture image (S22). The determination unit 36 determines whether or not the determination target image is similar to the reference image (S24), and in a case where the determination target image is similar to the reference image (Y in S24), the processing returns to S22. In a case where the determination target image is not similar to the reference image (N in S24), and the storage unit 26 stores the determination target image (S26) and the setting unit 32 sets the determination target image as a new reference image (S28) and the processing returns to S22.

According to the present embodiment as described above, the determination is made whether or not the determination target image is similar to the reference image based on the luminance value, and the capture image is stored excluding the determination target image determined to be similar to the reference image. Therefore, it is possible to further reduce the amount of data to be stored. The amount of data transmitted to the server device can also be reduced.

Since the determination is made based on the luminance value, the amount of calculation in the derivation unit 34 can be reduced as compared with a case where the determination is made based on a feature quantity or the like of the image other than the luminance value; therefore, the determination can be made at high speed.

In a case where the amount of variation in the average value of the luminance values of the determination target image with respect to the reference image is derived on a per area basis, and the number of areas having the absolute value of the amount of variation less than the predetermined value is the predetermined number or more, the determination target image is determined to be similar to the reference image. Therefore, it is possible to perform the determination faster than a case of comparing the luminance value for each pixel of the reference image and the determination target image.

Since the determination target image determined not to be similar to the reference image is set as a new reference image, the following determination can be appropriately performed. Since all the capture images are set as the determination target image in image capturing order, the determination can be made whether or not all the capture images are similar to the reference image.

The determination unit 36 makes a determination while the capture image remains captured. Therefore, when the ignition switch is turned off, the determination can be completed. For this reason, when the ignition switch is turned off, the capture image can be promptly transmitted to the server device.

The embodiment has been described as above. The embodiment is merely an example, and it is understood by those skilled in the art that various modification examples can be made to the combination of each constituent element and each processing process and the modification example is also included in the scope of the disclosure.

For example, in a case where a sudden acceleration, a sudden deceleration, or an abrupt steering wheel operation is detected by an acceleration sensor (not shown) or the like provided in the vehicle, the processing unit 24 may leave the capture image in the storage unit 26 from the time when it goes back for a first predetermined time from the time when a sudden acceleration or the like is detected to the time when a second predetermined time elapses from the time when the sudden acceleration or the like is detected and may remove other capture images. The first predetermined time and the second predetermined time can be appropriately determined by an experiment or the like. In the present modification example, solely the capture image before and after the time when the sudden acceleration or the like has occurred due to some event among the capture images stored in the storage unit 26 by the processing of the embodiment remains. Therefore, it is possible to further reduce the amount of data to be stored.

The example in which all the capture images are set as the determination target images in image capturing order has been described; however, the setting unit 32 may narrow down the capture images and may set solely a part of the capture images as the determination target image. For example, the setting unit 32 may set the capture image captured first as the first reference image and may skip a predetermined number of capture image from the capture images to set the determination target image.

In the present modification example, in a case where the determination target image is determined to be similar to the reference image, the storage unit 26 does not store the determination target image and the capture images between the reference image and the determination target image. In this case, the setting unit 32 does not change the reference image and skips a predetermined number of capture images captured after the determination target image determined to be similar to the reference image to set a new determination target image. In a case where the determination target image is determined not to be similar to the reference image, the storage unit 26 stores the determination target image and the capture images between the reference image and the determination target image. In this case, the setting unit 32 sets the determination target image determined not to be similar to the reference image as a new reference image and skips a predetermined number of capture images captured after the new reference image to set a new determination target image.

According to the present modification example, the processing of the processing unit 24 can be reduced. For this reason, it is possible to complete the determination when the ignition switch is turned off by using the processing unit 24 having lower processing capability than in the above embodiment. Therefore, it is possible to further reduce the amount of data to be stored.

As long as the determination unit 36 determines whether or not the determination target image is similar to the reference image based on the luminance values of the reference image and the determination target image, a determination method different from the embodiment may be adopted. For example, the determination unit 36 may compare the luminance value for each pixel of the reference image and the determination target image to make a determination based on the comparison result. In the present modification example, the degree of freedom of the configuration of the information processing apparatus 20 can be improved.

What is claimed is:

1. An information processing apparatus comprising:
   an acquisition unit configured to acquire an image outside a vehicle, the image being captured by a camera installed in the vehicle;
   a determination unit configured to determine whether or not a determination target image is similar to a reference image based on luminance values of (i) the reference image and (ii) the determination target image, the reference image being selected from pieces of image acquired by the acquisition unit and the determination target image being captured after the reference image is acquired; and
   a storage unit configured to store the image acquired by the acquisition unit excluding the determination target image determined to be similar to the reference image by the determination unit,
   wherein the determination unit is further configured to determine a first image captured after a predetermined number of capture images are captured as the determination target image,
   wherein the predetermined number of capture images are captured after the reference image is captured,
   wherein the storage unit is further configured to store a second image when the determination unit determines that the determination target image is not similar to the reference image, and
   wherein the second image is captured before the determination target image is captured and after the reference image is captured.

2. The information processing apparatus according to claim 1, further comprising a derivation unit configured to partition each of the reference image and the determination target image into a plurality of areas, to derive an average value of the luminance values in each area, and to derive an amount of variation in the average value of the luminance values of the determination target image with respect to the reference image on each of the plurality of areas,
   wherein the determination unit determines that the determination target image is similar to the reference image when the number of areas having an absolute value of the amount of variation less than a predetermined value is a predetermined number or more.

3. The information processing apparatus according to claim 1, further comprising a setting unit configured to set a determination target image determined not to be similar to the reference image by the determination unit as a new reference image.

4. The information processing apparatus according to claim 1, further comprising a setting unit configured to set an image captured subsequent to the determination target image determined to be similar to the reference image as a new determination target image without changing the reference image when the determination target image is determined to be similar to the reference image by the determination unit.

5. The information processing apparatus according to claim 1, wherein the determination unit determines whether or not the determination target image is similar to the reference image while the image remains captured.

6. The information processing apparatus according to claim 3, wherein the setting unit sets all the images as the determination target images in image capturing order.

* * * * *